United States Patent
Nagai (10) Patent No.: US 7,244,938 B2
(45) Date of Patent: Jul. 17, 2007

(54) METHOD OF CHECKING A LASER PROCESSED DETERIORATED LAYER

(75) Inventor: Yusuke Nagai, Tokyo (JP)

(73) Assignee: Disco Corporation, Tokyo (JP)

( * ) Notice: Subject to any disclaimer, the term of this patent is extended or adjusted under 35 U.S.C. 154(b) by 195 days.

(21) Appl. No.: 11/003,327

(22) Filed: Dec. 6, 2004

(65) Prior Publication Data

US 2005/0134868 A1   Jun. 23, 2005

(30) Foreign Application Priority Data

Dec. 8, 2003   (JP) .............................. 2003-409187

(51) Int. Cl.
*G01J 5/02* (2006.01)
(52) U.S. Cl. ................................. 250/341.4
(58) Field of Classification Search ............. 250/341.4, 250/341.1
See application file for complete search history.

(56) References Cited

U.S. PATENT DOCUMENTS

| | | | |
|---|---|---|---|
| 2002/0113210 A1* | 8/2002 | Treado et al. ................ | 250/331 |
| 2003/0224543 A1* | 12/2003 | Roy et al. ...................... | 438/16 |
| 2005/0054179 A1* | 3/2005 | Nagai .......................... | 438/460 |

FOREIGN PATENT DOCUMENTS

JP   2003-88975   3/2003

OTHER PUBLICATIONS

Aligning Semiconductor Masks, Dec. 1, 1970, IBM Technical Disclosure Bulletin, vol. 13 Issue 7, pp. 1816-1817.*

* cited by examiner

*Primary Examiner*—David Porta
*Assistant Examiner*—David S. Baker
(74) *Attorney, Agent, or Firm*—Smith, Gambrell & Russell, LLP (57) ABSTRACT

A method of checking a deteriorated layer formed in the inside of a workpiece along a dividing line by applying a laser beam capable of passing through the workpiece to the workpiece along the dividing line formed on the workpiece, the method comprising a focusing step of positioning a microscope of infrared image pick-up means to the dividing line formed on the workpiece, and setting the focusing point of the microscope to a position where the deteriorated layer in the inside of the workpiece has been formed; and an image pick-up step of picking up an image of the inside of the workpiece by moving the infrared image pick-up means and the workpiece along the dividing line relative to each other to scan the workpiece, wherein the deteriorated layer formed in the inside of the workpiece is checked based on the image picked up in the image pick-up step.

3 Claims, 6 Drawing Sheets

METHOD OF CHECKING A LASER PROCESSED DETERIORATED LAYER

FIELD OF THE INVENTION

The present invention relates to a method of checking a deteriorated layer that is formed along a dividing line in the inside of a workpiece by applying a laser beam capable of passing through the workpiece to the workpiece along the dividing line formed on the workpiece.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a circuit such as IC, LSI or the like is formed in each of the sectioned areas. Individual semiconductor chips are manufactured by cutting this semiconductor wafer along the dividing lines to divide it into the areas in which the circuits are formed thereon. An optical device wafer comprising gallium nitride-based compound semiconductors and the like formed on the front surface of a sapphire substrate is also cut along dividing lines to be divided into individual optical devices such as light emitting diodes or laser diodes, and these optical devices are widely used in electric equipment.

Cutting along the dividing lines of the above semiconductor wafer or optical device wafer is generally carried out by a cutting machine called "dicer". This cutting machine comprises a chuck table for holding a workpiece such as a semiconductor wafer or optical device wafer, a cutting means for cutting the workpiece held on the chuck table, and a cutting-feed means for moving the chuck table and the cutting means relative to each other. The cutting means has a spindle unit which comprises a rotary spindle, a cutting blade mounted to the spindle and a drive mechanism for rotary-driving the rotary spindle. The cutting blade comprises a disk-like base and an annular cutting edge which is mounted to the side wall periphery portion of the base and formed as thick as about 20 μm by fixing diamond abrasive grains having a diameter of about 3 μm to the base by electroforming.

Since a sapphire substrate, silicon carbide substrate, etc. have high Mohs hardness, cutting with the above cutting blade is not always easy. Further, since the cutting blade has a thickness of about 20 μm, the dividing lines for sectioning devices must be as thick as about 50 μm. Therefore, in the case of a device measuring about 300 μm×300 μm, the area ratio occupied by the dividing lines is large, thereby reducing productivity.

Meanwhile, as a means of dividing a plate-like workpiece such as a semiconductor wafer, a laser beam processing method for applying a pulse laser beam capable of passing through the workpiece with its focusing point set to the inside of the area to be divided has been attempted, and disclosed by JP-A 2003-88975, for example. In the dividing method using this laser beam processing technique, the workpiece is divided by applying a pulse laser beam of an infrared range capable of passing through the workpiece from one side of the workpiece with its focusing point set to the inside to continuously form deteriorated layers in the inside of the workpiece along the dividing lines and exerting external force along the dividing lines whose strength has been reduced by the formation of the deteriorated layers.

To divide the workpiece having deteriorated layers formed in the inside along the dividing lines without fail by applying a pulse laser beam, the deteriorated layers must be reliably formed at a predetermined position in the inside of the workpiece. However, when a pulse laser beam is applied without positioning the focusing point of the pulse laser beam to the predetermined position in the inside of the workpiece, the deteriorated layers cannot be formed at the predetermined position in the inside of the workpiece. Since the deteriorated layers formed in the inside of the workpiece cannot be checked from the outside, there is a problem that when external force is applied to the workpiece having no deteriorated layers in the inside along the dividing lines, the workpiece may be broken.

SUMMARY OF THE INVENTION

It is an object of the present invention to provide a method of checking laser processed deteriorated layers, which is capable of checking the deteriorated layers formed in the inside of a workpiece by applying a laser beam to the workpiece without fail.

To attain the above object, according to the present invention, there is provided a method of checking a laser processed deteriorated layer, which is formed in the inside of a workpiece along a dividing line by applying a laser beam having permeability for the workpiece to the workpiece along the dividing line formed on the workpiece, the method comprising:

a focusing step of positioning a microscope of an infrared image pick-up means opposite to the dividing line formed on the workpiece, and setting the focusing point of the microscope to a position where the deteriorated layer in the inside of the workpiece has been formed; and an image pick-up step of picking up an image of the inside of the workpiece by moving the infrared image pick-up means and the workpiece along the dividing line relative to each other to scan the workpiece, wherein the deteriorated layer formed in the inside of the workpiece is checked based on the image picked up in the image pick-up step.

A standard line parallel to the relative movement direction is formed in the microscope and whether the deteriorated layer is formed at a predetermined position is checked based on a shift between the standard line and the deteriorated layer whose image has been picked up. Further, the focusing point of the microscope is moved in the thickness direction of the workpiece to scan it, thereby checking a difference in the position in the thickness direction of the deteriorated layer.

Since in the present invention, the focusing point of the microscope of the infrared image pick-up means is set to the deteriorated layer formed in the inside of the workpiece along the dividing line to pick up an image of the inside of the workpiece, the deteriorated layer which cannot be checked from the outside can be checked without fail.

DETAILED DESCRIPTION OF THE PREFERRED EMBODIMENTS

The method of checking a laser processed deteriorated layer according to a preferred embodiment of the present invention will be described in detail hereinunder with reference to the accompanying drawings.

Figure 1:
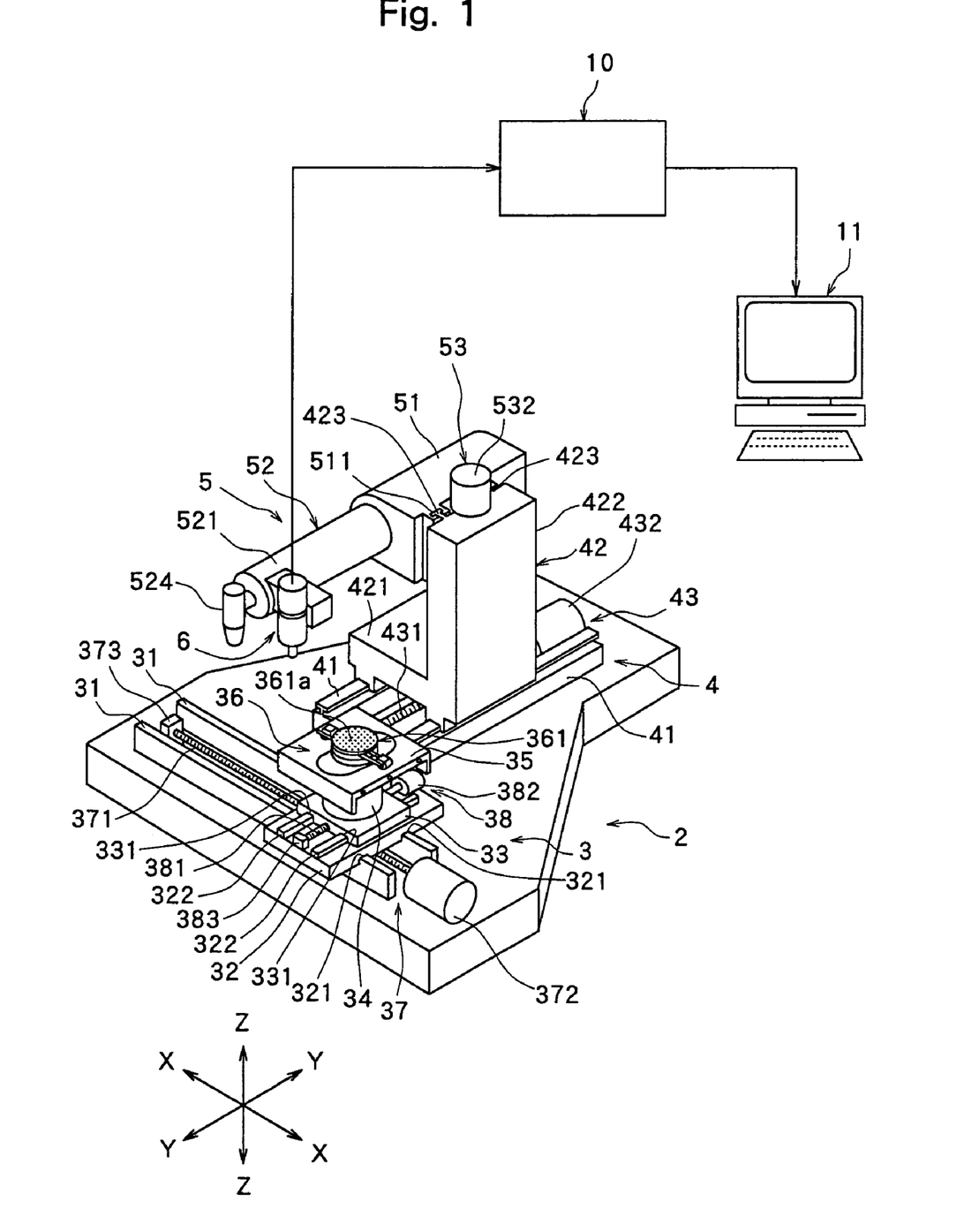
FIG. 1 is a perspective view of a laser beam processing machine for carrying out the method of checking a laser processed deteriorated layer according to the present invention.

FIG. 1 is a perspective view of a laser beam processing machine for carrying out the method of checking a laser processed deteriorated layer according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction indicated by an arrow X, a laser beam application unit support mechanism 4 mounted on the stationary base 2 in such a manner that it can move in an indexing-feed direction indicated by an arrow Y perpendicular to the direction indicated by the arrow X, and a laser beam application unit 5 mounted to the laser beam application unit support mechanism 4 in such a manner that it can move in a direction indicated by an arrow Z.

The above chuck table mechanism 3 comprises a pair of guide rails 31 and 31 that are mounted on the stationary base 2 and arranged parallel to each other in the direction indicated by the arrow X, a first sliding block 32 mounted on the guide rails 31 and 31 in such a manner that it can move in the direction indicated by the arrow X, a second sliding block 33 mounted on the first sliding block 32 in such a manner that it can move in the direction indicated by the arrow Y, a support table 35 supported on the second sliding block 33 by a cylindrical member 34, and a chuck table 36 as a workpiece holding means. This chuck table 36 comprises an adsorption chuck 361 made of a porous material so that a semiconductor wafer as a workpiece is held on the workpiece holding surface 361a of the adsorption chuck 361 by a suction means that is not shown. The chuck table 36 is rotated by a pulse motor (not shown) installed in the cylindrical member 34.

The above first sliding block 32 has, on its undersurface, a pair of to-be-guided grooves 321 and 321 to be fitted to the above pair of guide rails 31 and 31 and, on its top surface, a pair of guide rails 322 and 322 formed parallel to each other in the direction indicated by the arrow Y. The first sliding block 32 constituted as described above can move in the direction indicated by the arrow X along the pair of guide rails 31 and 31 by fitting the to-be-guided grooves 321 and 321 to the pair of guide rails 31 and 31, respectively. The chuck table mechanism 3 in the illustrated embodiment comprises a processing-feed means 37 for moving the first sliding block 32 along the pair of guide rails 31 and 31 in the processing-feed direction indicated by the arrow X. The processing-feed means 37 has a male screw rod 371 arranged between the above pair of guide rails 31 and 31 and in parallel to them, and a drive source such as a pulse motor 372 for rotary-driving the male screw rod 371. The male screw rod 371 is, at its one end, rotatably supported onto a bearing block 373 fixed on the above stationary base 2 and is, at the other end, transmission-connected to the output shaft of the above pulse motor 372 by a speed reducer that is not shown. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X.

The above second sliding block 33 has, on its undersurface, a pair of to-be-guided grooves 331 and 331 to be fitted to the pair of guide rails 322 and 322 on the top surface of the above first sliding block 32 and can move in the indexing-feed direction indicated by the arrow Y by fitting the to-be-guided grooves 331 and 331 to the pair of guide rails 322 and 322, respectively. The chuck table mechanism 3 in the illustrated embodiment comprises a first indexing-feed means 38 for moving the second sliding block 33 in the indexing-feed direction indicated by the arrow Y along the pair of guide rails 322 and 322 on the first sliding block 32. The first indexing-feed means 38 has a male screw rod 381 which is arranged between the above pair of guide rails 322 and 322 in parallel to them, and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-connected to the output shaft of the above pulse motor 382 by a speed reducer that is not shown. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y.

The above laser beam application unit support mechanism 4 comprises a pair of guide rails 41 and 41 that are mounted on the stationary base 2 and are arranged parallel to each other in the indexing-feed direction indicated by the arrow Y and a movable support base 42 mounted on the guide rails 41 and 41 in such a manner that it can move in the indexing-feed direction indicated by the arrow Y. This movable support base 42 comprises a movable support portion 421 movably mounted on the guide rails 41 and 41 and a mounting portion 422 mounted on the movable support portion 421. The mounting portion 422 is provided with a pair of guide rails 423 and 423 extending in the direction indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction indicated by the arrow Y. This second indexing-feed means 43 has a male screw rod 431 arranged between the above pair of guide rails 41 and 41 in parallel to them, and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-connected to the output shaft of the above pulse motor 432 by a speed reducer that is not shown. The male screw rod 431 is screwed into a threaded through-hole formed in a female screw block (not shown) projecting from the under surface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction indicated by the arrow Y.

The laser beam application unit 5 in the illustrated embodiment has a unit holder 51 and a laser beam application means 52 secured to the unit holder 51. The unit holder 51 has a pair of to-be-guided grooves 511 and 511 to be slidably fitted to the pair of guide rails 423 and 423 on the above mounting portion 422, and is supported in such a manner that it can move in the direction indicated by the arrow Z, that is, in a direction perpendicular to the workpiece holding surface 361a of the adsorption chuck 361 constituting the above chuck table 36 by fitting the to-be-guided grooves 511 and 511 to the above guide rails 423 and 423, respectively.

Figure 2:
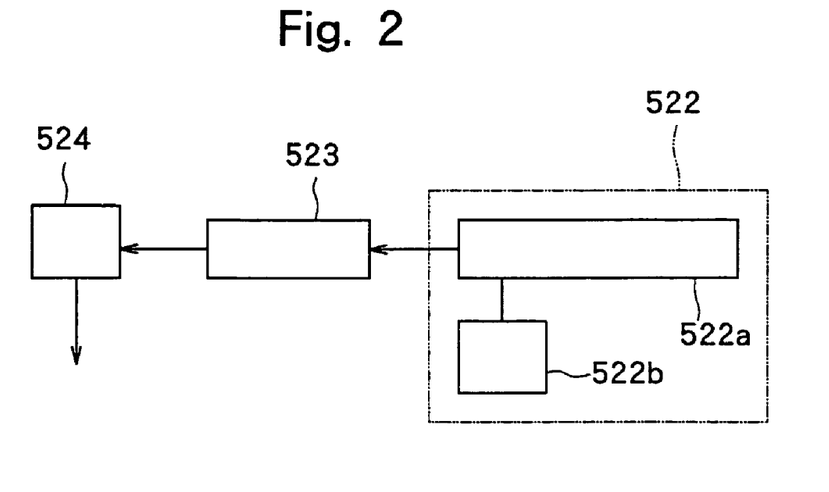
FIG. 2 is a block diagram schematically showing the constitution of laser beam application means provided in the laser beam processing machine shown in FIG. 1.

The illustrated laser beam application means 52 comprises a cylindrical casing 521 that is secured to the above unit holder 51 and extends substantially horizontally. In the casing 521, there are installed a pulse laser beam oscillation means 522 and a transmission optical system 523 as shown in FIG. 2. The pulse laser beam oscillation means 522 comprises a pulse laser beam oscillator 522a composed of a YAG laser oscillator or YVO4 laser oscillator and a repetition frequency setting means 522b connected to the pulse laser beam oscillator 522a. The transmission optical system 523 comprises suitable optical elements such as a beam splitter, etc. A condenser 524 housing condensing lenses (not shown) constituted by a set of lenses that may be a known formation is attached to the end of the above casing 521.

Figure 3:
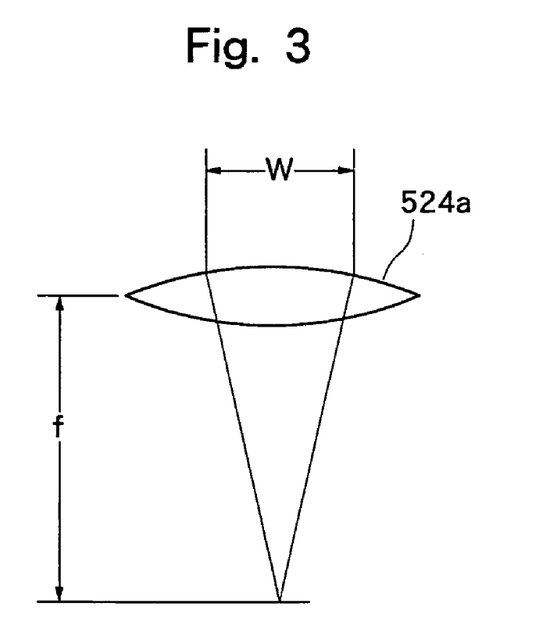
FIG. 3 is a schematic diagram for explaining the focusing spot diameter of a pulse laser beam.

A laser beam oscillated from the above pulse laser beam oscillation means 522 reaches the condenser 524 through the transmission optical system 523 and is applied from the condenser 524 to the workpiece held on the above chuck table 36 at a predetermined focusing spot diameter D. This focusing spot diameter D is defined by the expression $D (\mu m) = 4 \times \lambda \times f / (\pi \times W)$ (wherein $\lambda$ is the wavelength ($\mu m$) of the pulse laser beam, W is the diameter (mm) of the pulse laser beam applied to an objective lens 524a, and f is the focusing distance (mm) of the objective lens 524a) when the pulse laser beam having a Gauss distribution is applied through the objective lens 524a of the condenser 524 as shown in FIG. 3.

Returning to FIG. 1, an infrared image pick-up means 6 is situated at the front end of the casing 521 constituting the above laser beam application means 52. This infrared image pick-up means 6 will be described with reference to FIG. 4.

Figure 4:
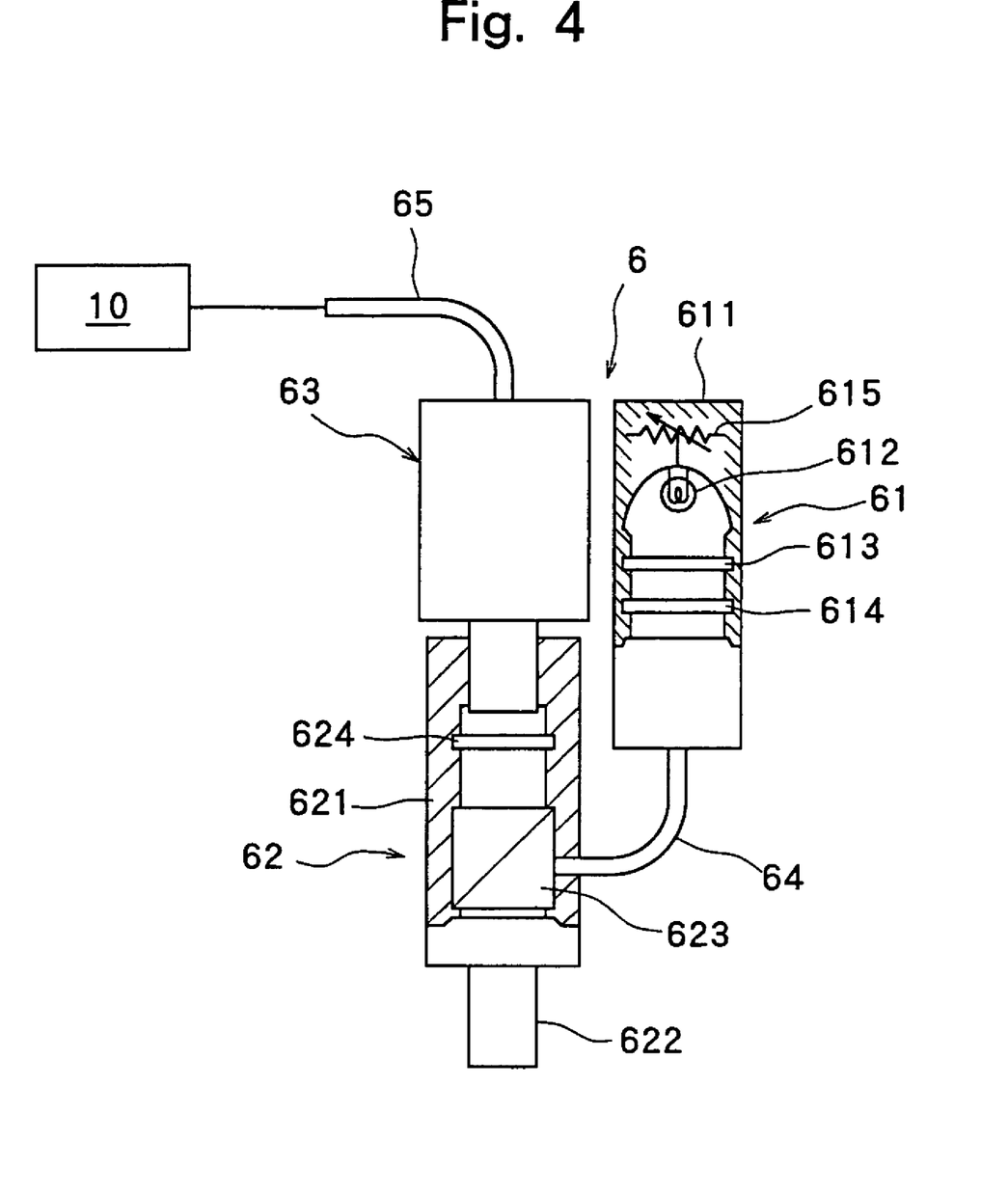
FIG. 4 is a diagram of the infrared image pick-up means provided in the laser beam processing machine shown in FIG. 1.

The infrared image pick-up means shown in FIG. 4 comprises an illuminating means 61, a microscope 62 and an infrared image pick-up device (infrared CCD) 63. The illuminating means 61 comprises a case 611, an illuminant 612 such as a halogen lamp installed in the case 611, a heat-ray absorbing filter 613 arranged below the illuminant 612 and an infrared-transparent narrow-band-path filter 614 arranged below the heat-ray absorbing filter 613. In the illuminating means 61 constituted as described above, the illuminant 612 is connected to a power source (not shown) via a dimmer 615 to apply infrared radiation through the infrared transparent narrow-band-path filter 614.

The above microscope 62 comprises a case 621, an optical system consisting of an objective lens 622 attached to the lower end of the case 621 and a half mirror 623 installed in the case 621, and an infrared transparent narrow-band-path filter 624 arranged above the half mirror 623. The half mirror 623 and the above infrared transparent narrow-band-path filter 614 are connected to each other by a glass fiber 64. The infrared image pick-up device 63 is mounted to the microscope 62 thus constituted in such a manner that their optical axes are aligned with each other. The infrared image pick-up device 63 outputs an electric signal corresponding to infrared radiation applied thereto through the above infrared transparent narrow-band-path filter 624. The electric signal from the infrared image pick-up device 63 is transmitted to a control means 10 which is composed of a computer via a cable 65 and which in turn carries out predetermined processing such as image processing, etc. based on the input electric signal to display the result of processing on a display means 11.

The infrared image pick-up means 6 may have a constitution comprising either one of the above infrared transparent narrow-band-path filters 614 and 624. The glass fiber 64 for connecting the illuminating means 61 to the half mirror 623 of the microscope 62 is not always necessary, and infrared radiation may be directly applied to the illuminating means 61 and the half mirror 623 of the microscope 62. Further, the illuminating means 61 may have a constitution to apply infrared radiation to the workpiece directly, independent of the microscope 62.

Figure 5:
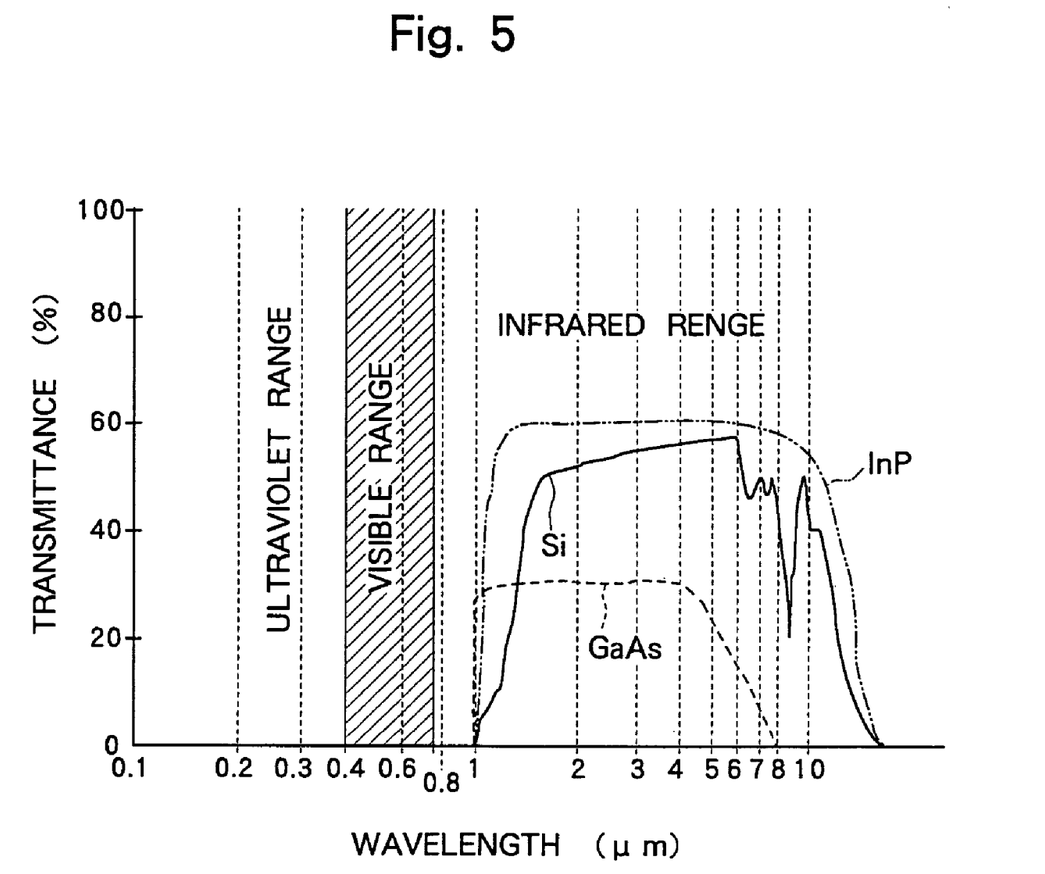
FIG. 5 is a graph showing transmittances of semiconductor wafer materials.

FIG. 5 is a graph showing the transmittances of silicon (Si), gallium arsenic (GaAs) and indium (InP) crystals used as the materials of a semiconductor wafer. In the graph, the horizontal axis shows the wavelength of light and the vertical axis shows transmittance. As understood from FIG. 5, all of the above materials have a high transmittance at an infrared range of 1 to 10 μm. Therefore, the narrow-band-path filter 614 of the illuminating means 61 and the narrow-band-path filter 624 of the microscope 62 constituting the above infrared image pick-up means 6 may be narrow-band-path filters which allow to transmit only infrared radiation having a wavelength of 1 to 10 μm.

The laser beam application unit 5 of this embodiment shown in FIG. 1 has a focusing point position adjusting means 53 for moving the unit holder 51 along the pair of guide rails 423 and 423 in the direction indicated by the arrow Z, that is, in the direction perpendicular to the workpiece holding surface 361a of the adsorption chuck 361 constituting the above chuck table 36. The focusing point position adjusting means 53 comprises a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction indicated by the arrow Z. In the illustrated embodiment, the laser beam application means 52 is moved up by driving the pulse motor 532 in a normal direction and moved down by driving the pulse motor 532 in the reverse direction. Therefore, the focusing point position adjusting means 53 can adjust the position of the focusing point of a laser beam applied from the condenser 524 attached to the end of the casing 521. Since the above infrared image pick-up means 6 is mounted on the casing 521 constituting the laser beam application means 52 in the illustrated embodiment, it moves together with the laser beam application means 52. Therefore, the focusing point position adjusting means 53 also serves as a focusing point position adjusting means for adjusting the position of the focusing point of the microscope 62 of the infrared image pick-up means 6.

The laser beam processing machine in the illustrated embodiment is constituted as described above. A description is subsequently given of a laser processing method for forming a deteriorated layer in the inside of the workpiece with this laser beam processing machine and a method of checking this laser processed deteriorated layer.

Figure 6:
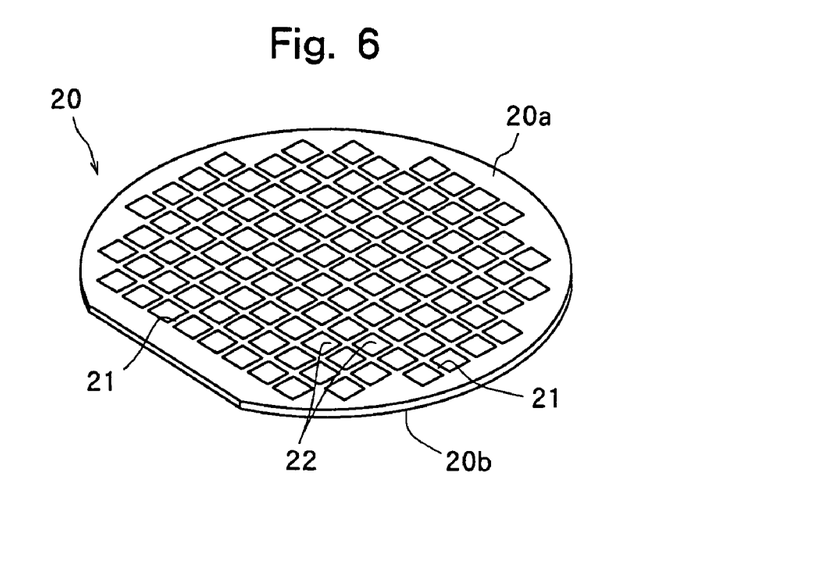
FIG. 6 is a perspective view of a semiconductor wafer as a workpiece.

FIG. 6 is a perspective view of a semiconductor wafer 20 comprising a silicon substrate as the workpiece. In the semiconductor wafer 20 shown in FIG. 6, a plurality of dividing lines 21 are formed in a lattice pattern on the front surface 20a, and a circuit 22 such as IC, LSI or the like is formed in a plurality of areas sectioned by the plurality of dividing lines 21. The laser processing method for forming a deteriorated layer in the inside of the semiconductor wafer 20 along each of the dividing lines 21 will be described with reference to FIG. 1 and FIGS. 7(a) and 7(b).

To form the deteriorated layer in the inside of the semiconductor wafer 20 along the dividing line 21 by the laser beam processing machine shown in FIG. 1, the semiconductor wafer 20 is first placed on the chuck table 36 of the above-described laser beam processing machine shown in FIG. 1 in such a manner that the back surface 20b faces up and suction-held on the chuck table 36. In the illustrated embodiment, the semiconductor wafer 20 is held on the chuck table 36 in such a manner that the back surface 20b faces up. The semiconductor wafer 20 maybe held on the chuck table 36 in such a manner that the front surface 20a faces up. The chuck table 36 suction-holding the semiconductor wafer 20 is moved along the guide rails 31 and 31 by the operation of the processing-feed means 37 and positioned right below the objective lens 622 constituting the infrared image pick-up means 6 mounted to the laser beam application unit 5.

After the chuck table 36 holding the semiconductor wafer 20 is positioned right below the objective lens 622 constituting the infrared image pick-up means 6, the infrared image pick-up means 6 and the control means 10 carry out image processing such as pattern matching to align a dividing line 21 formed on the semiconductor wafer 20 with the condenser 524 of the laser beam application means 52 for applying a laser beam along the dividing line 21, thereby performing the alignment of a laser beam application position. For this alignment, infrared radiation is applied from the illuminating means 61 of the infrared image pick-up means 6 to illuminate the semiconductor wafer 20 held on the chuck table 36 in such a manner that the back surface faces up through the microscope 62.

Infrared radiation applied to the semiconductor wafer 20 reaches the inside of the semiconductor wafer 20 and is reflected by the surfaces of the circuits such as IC's, LSI's or the like formed on the front surface 20a of the semiconductor wafer 20. An image formed by this reflected infrared radiation is caught by the microscope 62, infrared radiation caught by the microscope 62 is converted into an electric signal by the image pick-up device 63, and the electric signal is sent to the control means 10. At this point, the focusing point of the objective lens 622 constituting the microscope 62 is set to the front surface 20a (under surface) of the semiconductor wafer 20. Therefore, the microscope 62 catches an image of the front surface 20a (under side) of the semiconductor wafer 20 which has been focused. The control means 10 carries out image processing such as pattern matching based on the signal from the image pick-up device 63 to display the result of processing on the display means 11 and detect the dividing line 21 formed on the front surface 20a of the semiconductor wafer 20, thereby aligning it with the condenser 524 of the laser beam application means 52 for applying a laser beam.

Figure 7:
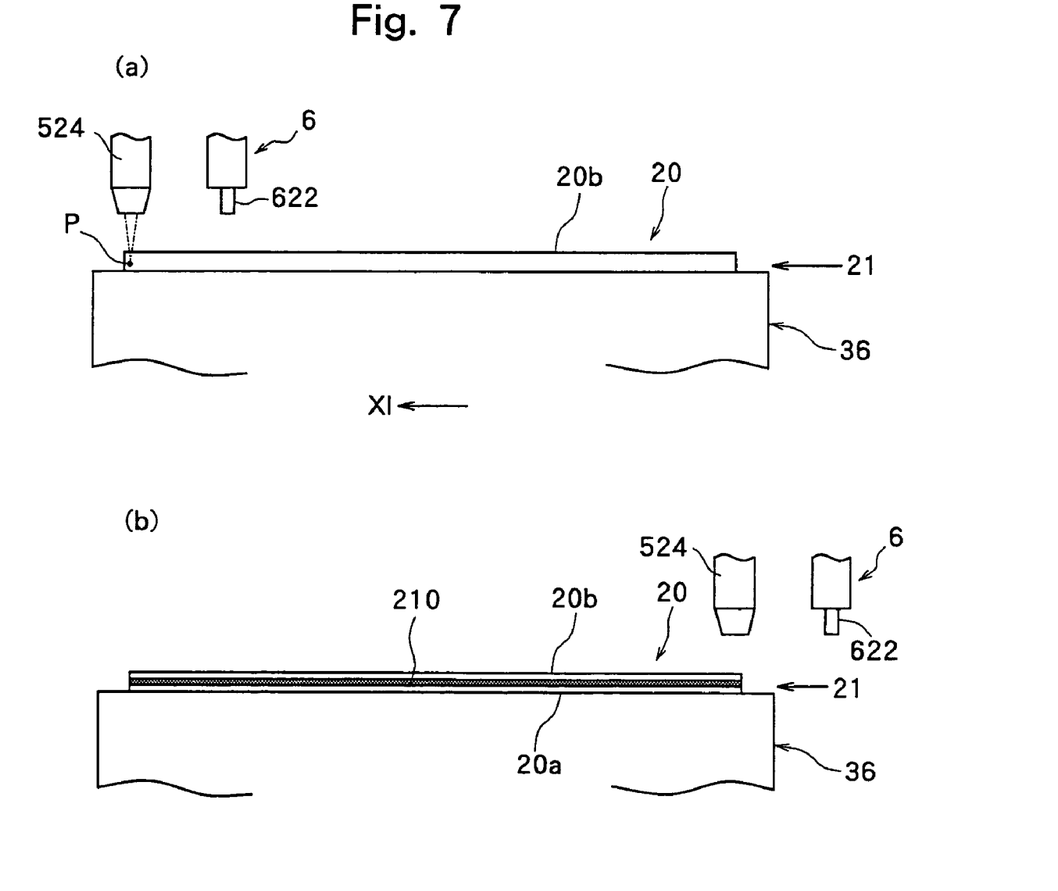
FIGS. 7(a) and 7(b) are diagrams showing a step of forming a deteriorated layer in the inside of the workpiece by using the laser beam processing machine shown in FIG. 1.

After the dividing line 21 formed on the semiconductor wafer 20 held on the chuck table 36 is detected and the alignment of the laser beam application position is carried out as described above, the chuck table 36 is moved to a laser beam application range where the condenser 524 of the laser beam application means 52 for applying a laser beam is located, to bring one end (left end in FIG. 7(a)) of the predetermined dividing line 21 to a position right below the condenser 524 of the laser beam application means 52 as shown in FIG. 7(a). The chuck table 36, that is, the semiconductor wafer 20 is moved in the direction indicated by the arrow X1 in FIG. 7(a) at a predetermined processing-feed rate while a pulse laser beam capable of passing through the semiconductor wafer 20 is applied from the condenser 524 (i.e., a deteriorated layer forming step is carried out). Then, when the application position of the condenser 524 of the laser beam application means 52 reaches the other end (right end in FIG. 7(b)) of the dividing line 21 as shown in FIG. 7(b), the application of the pulse laser beam is suspended and the movement of the chuck table 36, that is, the semiconductor wafer 20 is stopped. In this deteriorated layer forming step, a deteriorated layer 210 is formed in the inside of the semiconductor wafer 20 along the dividing line 21 by setting the focusing point P of the pulse laser beam to a predetermined position in the inside of the semiconductor wafer 20. This deteriorated layer 210 is formed as a molten-resolidified layer in which the wafer has been once molted and then re-solidified. The deteriorated layer 210 may be so constituted as to be exposed to the front surface 20a of the semiconductor wafer 20.

The processing conditions in the above deteriorated layer forming step are set as follows, for example.

Laser: pulse laser having a wavelength of 1,064 nm
Repetition frequency: 100 kHz
Pulse width: 25 ns
Peak power density: $3.2 \times 10^{10}$ W/cm$^2$
Focusing spot diameter: 1 μm
Processing-feed rate: 100 mm/sec The deteriorated layer 210 formed in the inside of the semiconductor wafer 20 along the dividing line 21 cannot be checked from the outside as described above. Therefore, it is necessary to check whether the deteriorated layer 210 is formed at the predetermined position in the inside of the semiconductor wafer 20 without fail. Then, after the above deteriorated layer forming step, a deteriorated layer checking step is carried out. The deteriorated layer checking step will be described hereinbelow with reference to FIG. 8 and FIG. 9.

Figure 8:
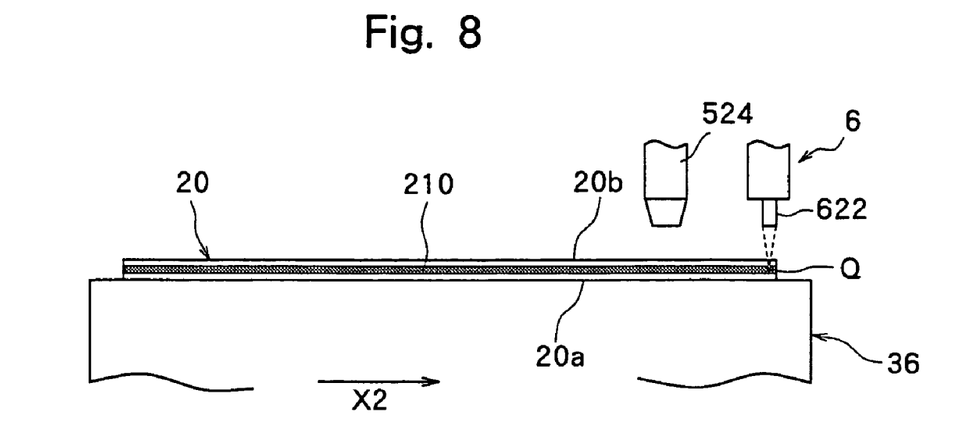
FIG. 8 is a diagram showing a step of checking the deteriorated layer formed in the inside of the workpiece in the deteriorated layer forming step shown in FIGS. 7(a) and 7(b)

In the deteriorated layer checking step, as shown in FIG. 8, the chuck table 36 is moved in the direction indicated by the arrow X2 from the state shown in FIG. 7(b) in which the above deteriorated layer forming step is completed, to bring the other end (right end in FIG. 8) of the dividing line 21 (i.e., dividing line where the deteriorated layer 210 is formed in the above deteriorated layer forming step) formed on the semiconductor wafer 20 held on the chuck table 36 to a position right below the objective lens 622 constituting the infrared image pick-up means 6. Thereafter, infrared radiation capable of passing through the semiconductor wafer 20 is then applied from the illuminating means 61 of the infrared image pick-up means 6 to illuminate the semiconductor wafer 20 held on the chuck table 36 through the microscope 62. At this point, the focusing point Q of the objective lens 622 constituting the microscope 62 is set to a predetermined depth position where the deteriorated layer 210 in the inside of the semiconductor wafer 20 is formed (focusing point setting step). Thereafter, the chuck table 36, that is, the semiconductor wafer 20 is moved in the direction indicated by the arrow X2 in FIG. 8 at a predetermined scanning speed until the focusing point Q reaches one end (left end in FIG. 8) of the dividing line 21. As a result, an image of the predetermined depth position of the semiconductor wafer 20, to which the focusing point Q of the objective lens 622 constituting the microscope 62 has been set, is caught by the microscope 62. The image caught by the microscope 62 is picked up by the infrared image pick-up device 63 to be converted into an electric signal which is then sent to the control means 10 (image pick-up step). The control means 10 carries out image processing based on the image data obtained by the infrared image pick-up means 6 to display an image on the display means 11.

Figure 9:
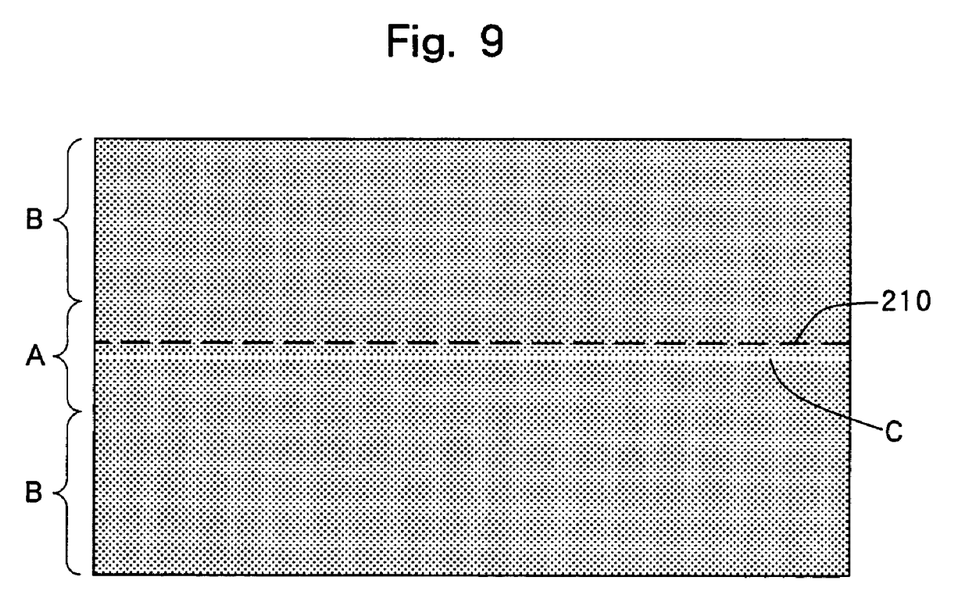
FIG. 9 is a diagram of an image of the inside of the workpiece picked up in the deteriorated layer forming step.

FIG. 9 shows an example of the image displayed on the display means 11.

In FIG. 9, the center portion of the image is the area A of the dividing line 21 formed on the above semiconductor wafer 20, areas on both sides of the area A of the dividing line 21 (upper and lower sides in FIG. 9) are areas B where the circuit 22 is formed. Further, the deteriorated layer 210 is shown in the area A of the dividing line 21 in FIG. 9. This means that the deteriorated layer 210 is formed at the predetermined depth position of the semiconductor wafer 20. In FIG. 9, the deteriorated layer 210 is shown by a broken line because a pulse laser beam is used as the laser beam applied in the above deteriorated layer forming step.

In FIG. 9, the dividing line and a hair line C as the standard line are shown. This hair line C is formed parallel to the processing-feed direction indicated by the arrow X in FIG. 1 in the microscope 62 and is aligned with the center position of the dividing line 21 at the time of the above alignment. Therefore, in the above deteriorated layer forming step, the deteriorated layer 210 is due to be formed at the center position of the dividing line 21. However, when a laser beam is applied for a long time, the laser beam application means 52 becomes hot and thermally expands and as a result, the application position of the laser beam applied from the condenser 524 of the laser beam application means 52 shifts in the direction indicated by the arrow Y in FIG. 1. When the above deteriorated layer forming step is carried out in a state where the laser beam application means 52 thermally expands as described above, even when the condenser 524 is so aligned as to accord with the center position of the dividing line 21 at the time of the alignment, the deteriorated layer 210 is formed at a position which shifts from the center position of the dividing line 21. FIG. 9 shows a state where the deteriorated layer 210 shifts from the center position, that is, the hair line C of the dividing line 21. Thus, according to the method of checking a deteriorated layer in the illustrated embodiment, it is possible to check whether the deteriorated layer is formed at the predetermined position or not.

When it is thus checked in the deteriorated layer checking step that the deteriorated layer 210 is not formed at the predetermined position of the semiconductor wafer 20, the above deteriorated layer forming step is carried out again if necessary. Further, when it is checked that the deteriorated layer 210 shifts from the predetermined position, the above second indexing-feed means 43 is activated to correct the position in the Y direction of the condenser 524 constituting the laser beam application means 52 to deal with the above shift. When it is checked that the deteriorated layer 210 shifts from the predetermined position, an adjustment screw (not shown) provided in the microscope 62 may be adjusted so that the hair line C and the deteriorated layer 210 are aligned with each other to carry out the above deteriorated layer checking step.

The difference in the position in the thickness direction of the deteriorated layer 210 formed in the semiconductor wafer 20 can also be checked in the above deteriorated layer forming step. When the semiconductor wafer 20 has differences in thickness direction, the deteriorated layer 210 cannot be formed uniformly at a predetermined depth in relation to the refractive index, at the time when a laser beam is applied. As a result, the deteriorated layer 210 with differences of the positions in the thickness direction is formed. To check this difference of the position in the thickness direction of the deteriorated layer 210, the focusing point of the objective lens 622 constituting the microscope 62 is moved in the direction perpendicular to the workpiece holding surface 361a of the adsorption chuck 361 constituting the above chuck table 36, that is, in the thickness direction of the semiconductor wafer 20, which is indicated by the arrow Z in FIG. 1, and the scanning is carried out, thereby making it possible to check the difference of the position in the thickness direction of the deteriorated layer 210 formed in the semiconductor wafer 20.

After the deteriorated layer forming step and the deteriorated layer checking step are carried out along the dividing line 21 in the predetermined direction formed on the wafer 20 as described above, the chuck table 36 or the laser beam application means 52 is indexing-moved by a distance corresponding to the interval between the dividing lines 21 in the indexing direction indicated by the arrow Y in FIG. 1 to carry out the above deteriorated layer forming step and the deteriorated layer checking step. After the above deteriorated layer forming step and the above deteriorated layer checking step are carried out on all the dividing lines formed in the predetermined direction, the chuck table 36 is turned at 90° to carry out the above deteriorated layer forming step and the above deteriorated layer checking step along dividing lines formed in the direction perpendicular to the above predetermined direction, thereby making it possible to form deteriorated layers 210 in the inside of the semiconductor wafer 20 along all the dividing lines 21 and to check the formed deteriorated layers.

In the above-described embodiment, the deteriorated layer forming step and the deteriorated layer checking step are carried out alternately on each dividing line 21. After the deteriorated layer forming step is carried out on all the dividing lines 21 formed on the wafer 20, the deteriorated layer checking step may be carried out. Or after the deteriorated layer forming step is carried out on a plurality of dividing lines 21, the deteriorated layer checking step may be carried out at random.

I claim:

1. A method of checking a laser processed deteriorated layer formed in a workpiece along a dividing line formed on the workpiece by applying a laser beam capable of passing through the workpiece along the dividing line, the method comprising:

a step of preparing an infrared image pick-up means having a microscope with an adjustable focusing point, the microscope being movable in a moving direction relative to the workpiece and having a standard line in a field of vision thereof, the standard line being parallel to the moving direction;

a focusing step of positioning the microscope opposite the dividing line on the workpiece, and setting the focusing point of the microscope to a position where the deteriorated layer in the workpiece has been formed;

an image pick-up step of picking up an image within the workpiece by moving the infrared image pick-up means and the workpiece along the dividing line relative to each other to scan the workpiece; and checking a shift of the picked up image of the deteriorated layer from the standard line to determine whether the deteriorated layer is formed on a predetermined line corresponding to the dividing line in the workpiece.

2. The method of checking a laser processed deteriorated layer according to claim 1, wherein the standard line is in an eyepiece of the microscope whether the deteriorated layer is formed at a predetermined position is checked based on a shift between the standard line and the deteriorated layer whose image has been picked up.

3. The method of checking a laser processed deteriorated layer according to claim 1, wherein the focusing point of the microscope is moved in a thickness direction of the workpiece to scan it, thereby checking a difference in the position of the deteriorated layer in the thickness direction.

* * * * *